United States Patent
Zumbrun, II et al.

(10) Patent No.: US 11,078,052 B1
(45) Date of Patent: Aug. 3, 2021

(54) ADAPTABLE CLEVIS KITS FOR TENSION FORCE CALIBRATION

(71) Applicant: Morehouse Instrument Company, Inc., York, PA (US)

(72) Inventors: Henry Zumbrun, II, York, PA (US); Alireza Zeinali, York, PA (US)

(73) Assignee: MOREHOUSE INSTRUMENT COMPANY, INC., York, PA (US)

( * ) Notice: Subject to any disclaimer, the term of this patent is extended or adjusted under 35 U.S.C. 154(b) by 1 day.

(21) Appl. No.: 16/775,350

(22) Filed: Jan. 29, 2020

(51) Int. Cl.
*B66C 1/66* (2006.01)
*G01L 5/00* (2006.01)

(52) U.S. Cl.
CPC ............. *B66C 1/66* (2013.01); *G01L 5/0066* (2013.01)

(58) Field of Classification Search
CPC ......... B66C 1/66; G01L 5/0066; F16G 15/02; F16G 15/06
USPC .......................... 294/215, 89, 82.1; 59/85, 86
See application file for complete search history.

(56) References Cited

U.S. PATENT DOCUMENTS

| | | | | |
|---|---|---|---|---|
| 4,063,413 A * | 12/1977 | Benton | ................... | B21L 13/00 59/85 |
| 5,823,588 A * | 10/1998 | Morghen | .................. | B66C 1/66 294/89 |
| 6,254,300 B1 * | 7/2001 | Crow | ..................... | F16G 15/02 59/85 |
| 7,393,033 B1 * | 7/2008 | Bisso, IV | ................ | F16G 15/06 294/82.1 |
| 7,448,823 B2 * | 11/2008 | Silva | ....................... | F16G 15/06 59/86 |
| 7,614,209 B1 * | 11/2009 | Payne | ..................... | F16G 15/06 294/82.1 |
| 7,997,056 B2 * | 8/2011 | Segura | ...................... | B66C 1/66 59/86 |
| 8,677,724 B2 * | 3/2014 | Chaney | ............... | A01F 15/0833 56/341 |
| 8,756,955 B2 * | 6/2014 | Walchle | .................. | F16B 45/00 403/79 |
| 2011/0265442 A1 * | 11/2011 | Segura | ...................... | B66C 1/10 59/86 |
| 2012/0104783 A1 * | 5/2012 | Gaibler | .................. | F16G 15/06 294/215 |
| 2013/0074469 A1 * | 3/2013 | Robins | .................... | F16G 15/06 59/86 |
| 2014/0325955 A1 * | 11/2014 | Kimura | ................... | F16G 13/12 59/86 |

* cited by examiner

*Primary Examiner* — Paul T Chin
(74) *Attorney, Agent, or Firm* — Schott, P.C.

(57) ABSTRACT

Adaptable clevis kits may be used when calibrating crane scales, dynamometers and tension links for force calibration laboratories. An adaptable clevis kit may include one set of devises (one pair) with multiple sets of pins with different diameters. With this kit, the same set of devises may be used for calibrating several models of instruments. For each instrument, the pin may be designed with the same diameter that the manufacturer originally made the equipment and reported on its specification sheets. With this method, the error due to difference in pin sizes is eliminated, and the laboratory may save the cost of purchasing dozens of different devises. The adaptable clevis kits may also be provided with a guiding table that help the user find the right size pin for the instrument being calibrated based on the manufacturer's original design.

7 Claims, 6 Drawing Sheets

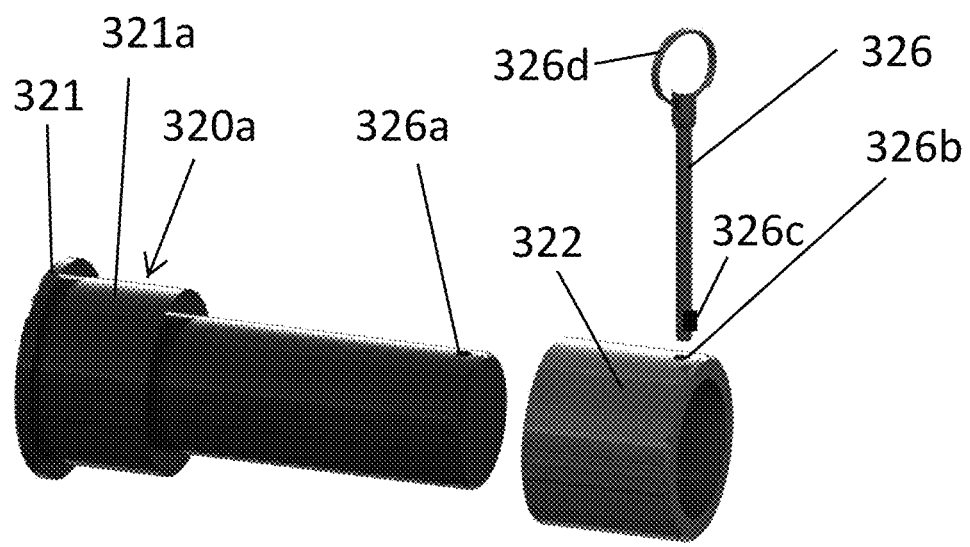
FIG. 3
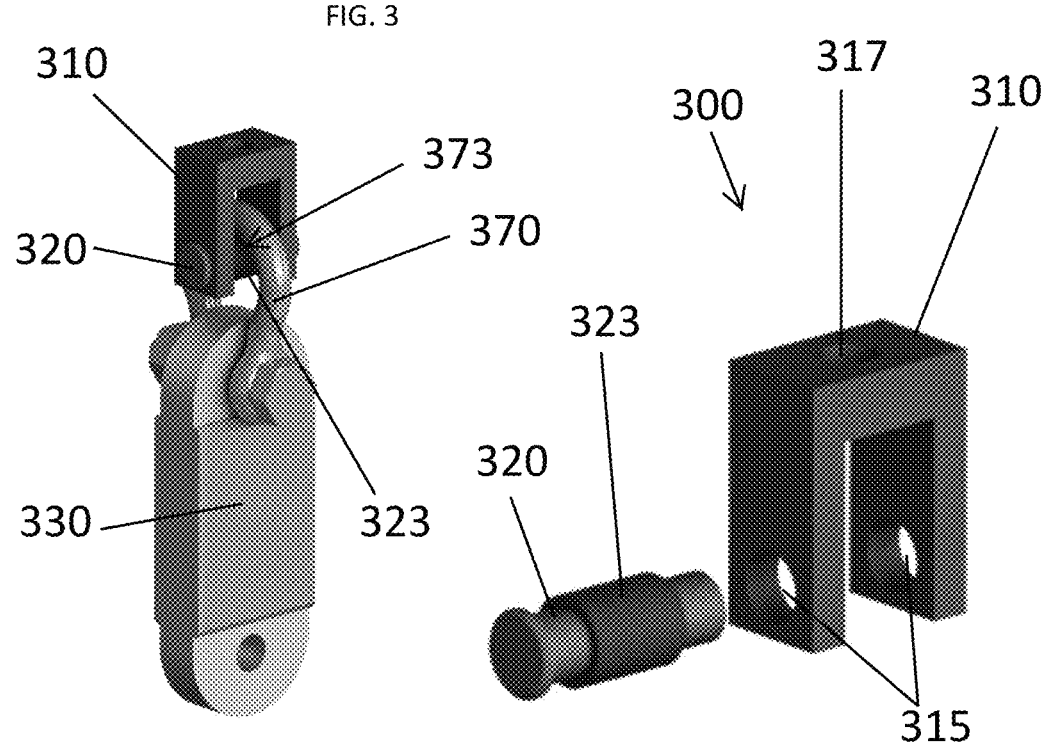
FIG. 4
FIG. 5

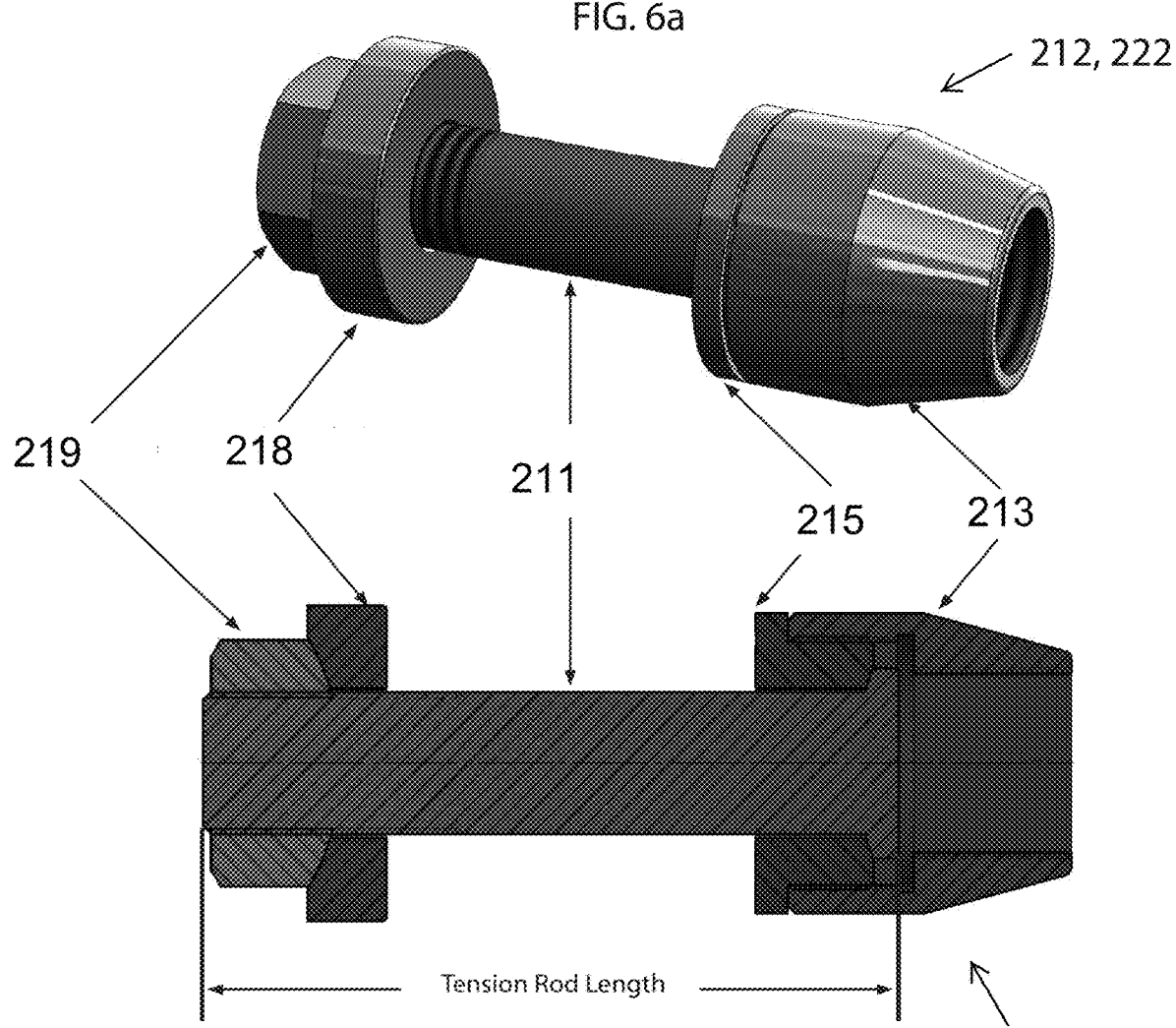

ADAPTABLE CLEVIS KITS FOR TENSION FORCE CALIBRATION

BACKGROUND

Crane scales, tension links, and dynamometers are force-measuring devices that are used for weighing heavy objects using a crane. In use, the devices are placed between the crane arm and the object being lifted and provide a reading as to the force being exerted by the object being lifted and moved so a crane operator can make any adjustments necessary to safely move the object.

Before use, the force measuring devices must be calibrated to show the accurate force values. In addition, they need to be recalibrated periodically to ensure measurements are within a specified tolerance and whether they need any adjustments. These types of instruments come in different varieties and capacities from several manufacturers. Their dimensions and configurations are not standardized, and thus calibrating them requires different clevis sizes.

As shown in FIG. 1, these instruments are normally used with a set of shackles or devises 100 to get attached to a crane hook. The devises and shackles 100 are connected to the dynamometers or other similar devices 130 using pins 120 that pass through the holes on two sides of the clevis body 110. The diameter of these pins 120 is one of the factors that impact the force readout values of these instruments 130.

Dynamometer pins 120 with different diameters distribute internal forces differently through the body of the instrument 130 that normally cause different force (F) readouts. As the result, the best practice of using dynamometers, crane scales and tension links is to pair them with the loading pins both during field use and calibration.

In practice, when dynamometer instruments are sent to a force calibration lab, they don't get shipped with the same pins that were used in the field. Thus, a calibration laboratory will need a clevis adapter to make a tension force setup in a force calibration machine as well as pins to install the instruments into calibration devises. Since these instruments are typically made to measure high forces, the design of the clevis adapters is also of critical importance, and they should be able to bear the calibration forces without imposing safety threats to operators. Due to the large variety of instrument dimension and pin sizes available on the market, a force calibration laboratory will need several devises and pin sets to be able to provide this service. Considering the high price of clevis adapters, this type of calibration becomes cost-prohibitive for most privately-run calibration companies.

SUMMARY OF THE EMBODIMENTS

Adaptable clevis kits address the issues listed associated with feasibility of calibrating crane scales, dynamometers and tension links for force calibration laboratories. An adaptable clevis kit may include one set of devises (one pair) with multiple sets of pins with different diameters. With this kit, the same set of devises may be used for calibrating several models of instruments. For each instrument, the pin may be designed with the same diameter that the manufacturer originally made the equipment and reported on its specification sheets. With this method, the error due to difference in pin sizes is eliminated, and the laboratory may save the cost of purchasing dozens of different devises. The adaptable clevis kits may also be provided with a guiding table that help the user find the right size pin for the instrument being calibrated based on the manufacturer's original design.

BRIEF DESCRIPTION OF THE DRAWINGS

FIG. 3-5 show the clevis, pin, and instrument as described herein.

FIGS. 6a, 6b, 7a, and 7b show details of mounting the clevis within a calibration machine using the tension members.

DETAILED DESCRIPTION OF THE EMBODIMENTS

Calibration Setup Overview

Figure 1:
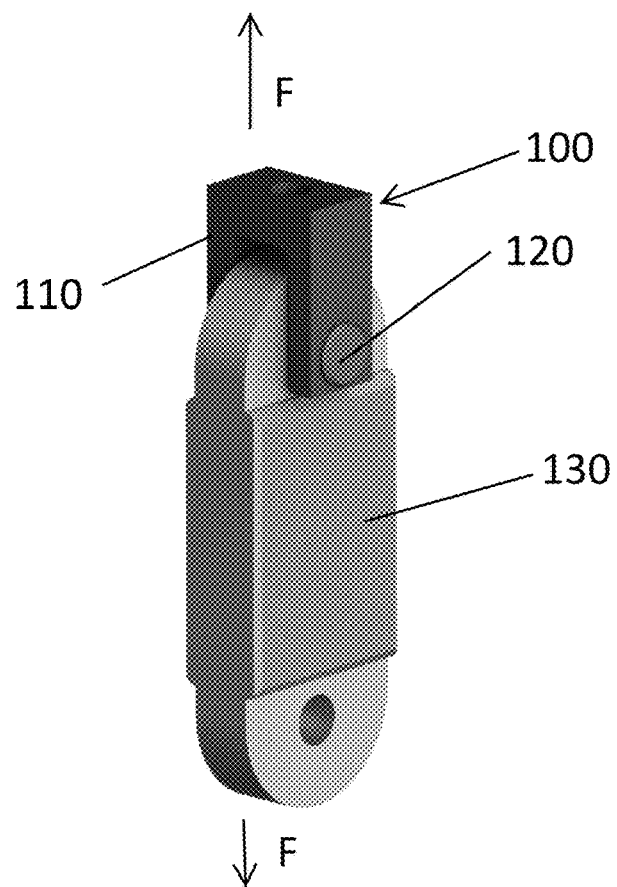
FIG. 1 shows a prior art arrangement of a clevis, pin, and instrument.
Figure 2A:
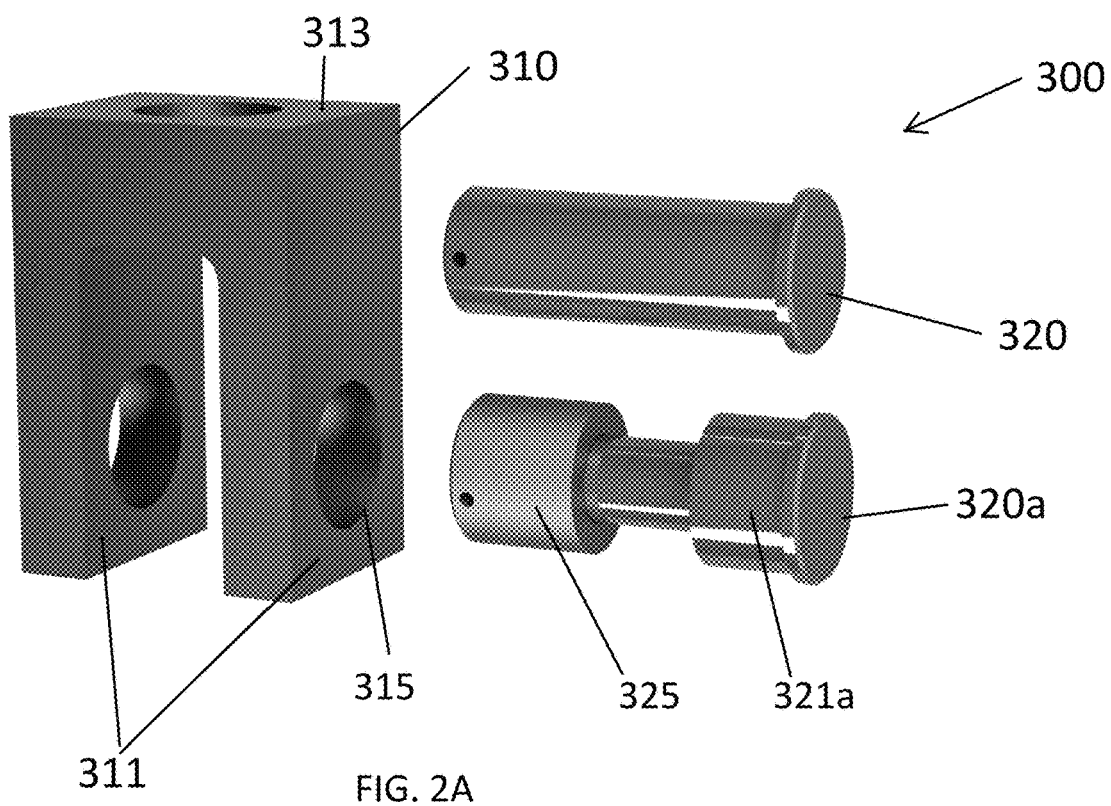
FIG. 2A shows certain elements of the clevis assembly.
Figure 2B:
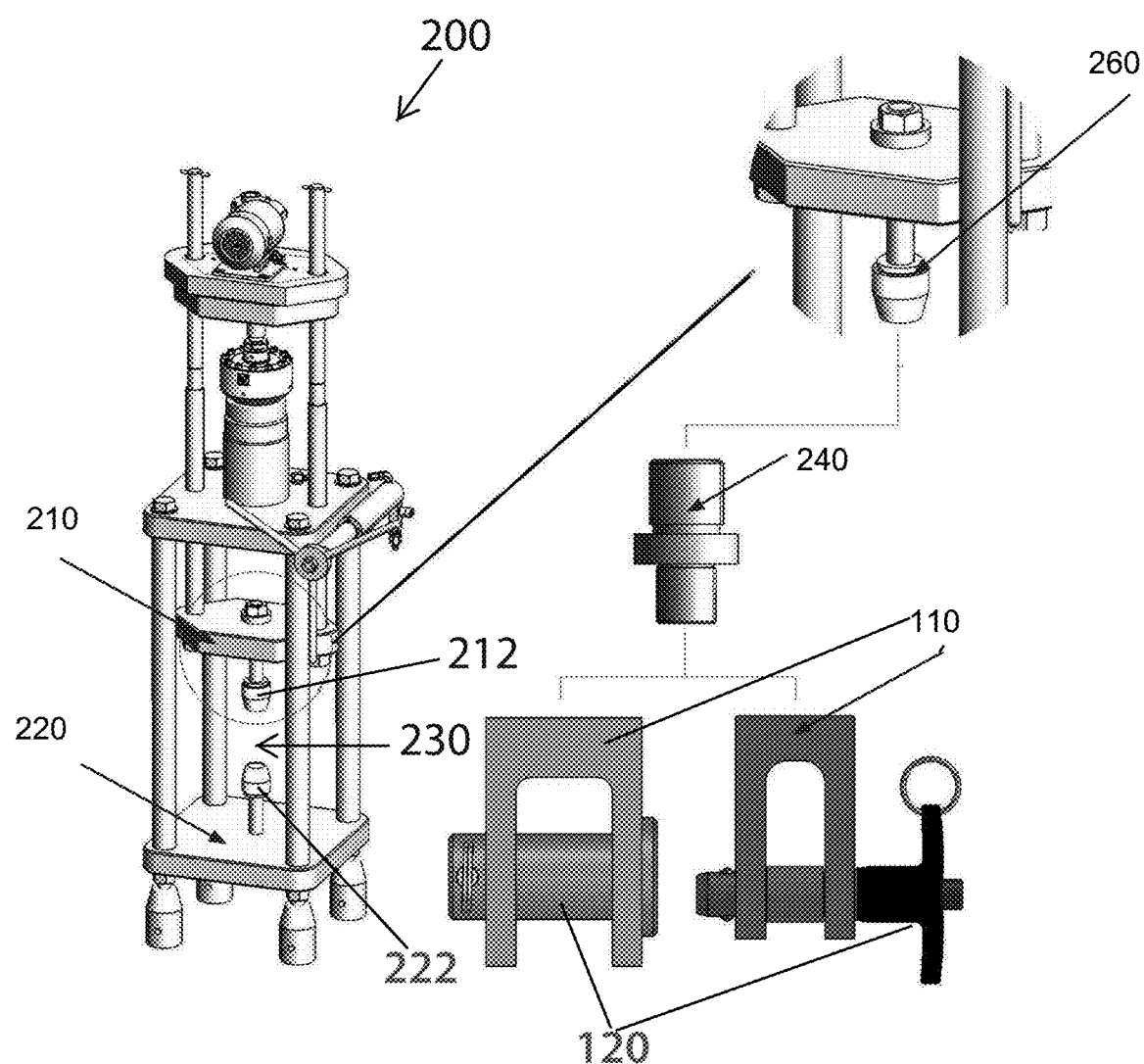
FIG. 2B shows an overview of the calibration machine with tension calibration setup.

FIGS. 2A and 2B show an overview of a calibration machine 200 used in a calibration lab that tests the clevis, pin, and force measurement instrument. The system includes two platens 210, 220 with tension members 212, 222 that are mounted on two sides on the tension calibration area 230 in which the clevis and pin may be placed within the calibrating machine 200: the clevis body 110 itself may be attached to the lower yoke platen 210 via an adaptor 240, which itself is attached to a tension member swiveling nut 260. The pin part 320 is also attached to the clevis through its loading hole 315. Similarly, a clevis assembly is attached to the lower tension member 222, to create a tension setup for calibrating dynamometer and similar force-measuring instruments. Each tension member 210, 220 is equipped with a swiveling nut 260 that helps with assembly and assists technicians to complete a tension setup in a shorter duration of time. In addition, each tension member 212, 222 may use two self-aligning spherical contact mechanisms that automatically align the instrument under test. This results in reduced misalignment errors in the calibration procedure and increased repeatability of force measurement when the unit under test is rotated between different runs of calibration.

In addition to the tension members 212, 222 a variety of threaded adapters (the variety including different threading, lengths, etc), 240 can change the setup configuration to accommodate a new instrument. Special threaded adapters 240 such as devises or rod ends may also be added to the system to calibrate instruments like crane scales or dynamometers. Regardless of the type of instrument or adapters used, the system may benefit from the self-aligning features of the tension members 212, 222. Since the tension members 212, 222 are common parts used for all tension calibrations, only a relatively small adapter 240 will be needed for a new instrument, and the rest of the setup can be used in common between all calibrations. This is advantageous over the regularly used method by most calibration labs that change the whole tension rod for every calibration to attach the instrument under test to the calibrating machine. Also this results in significant long-term savings for a force laboratory in term of acquiring and maintenance of tension calibration adapters.

This system helps calibration technicians with easier and faster tension setups. One of the tension members that is installed on the lower fixed platen can permanently stay in the machine and never come out even in compression calibration. This eliminates repeated installation of tension rods in this part of the machine which is normally the most cumbersome part of assembling a tension calibration setup. The system also reduces the amount of shelf space required for maintaining and organizing the adapters.

Clevis Mounting within Calibration Machine

FIGS. 6a, 6b, 7a, and 7b show details of mounting the clevis within a calibration machine using the tension members.

Figures 7A, 7B:
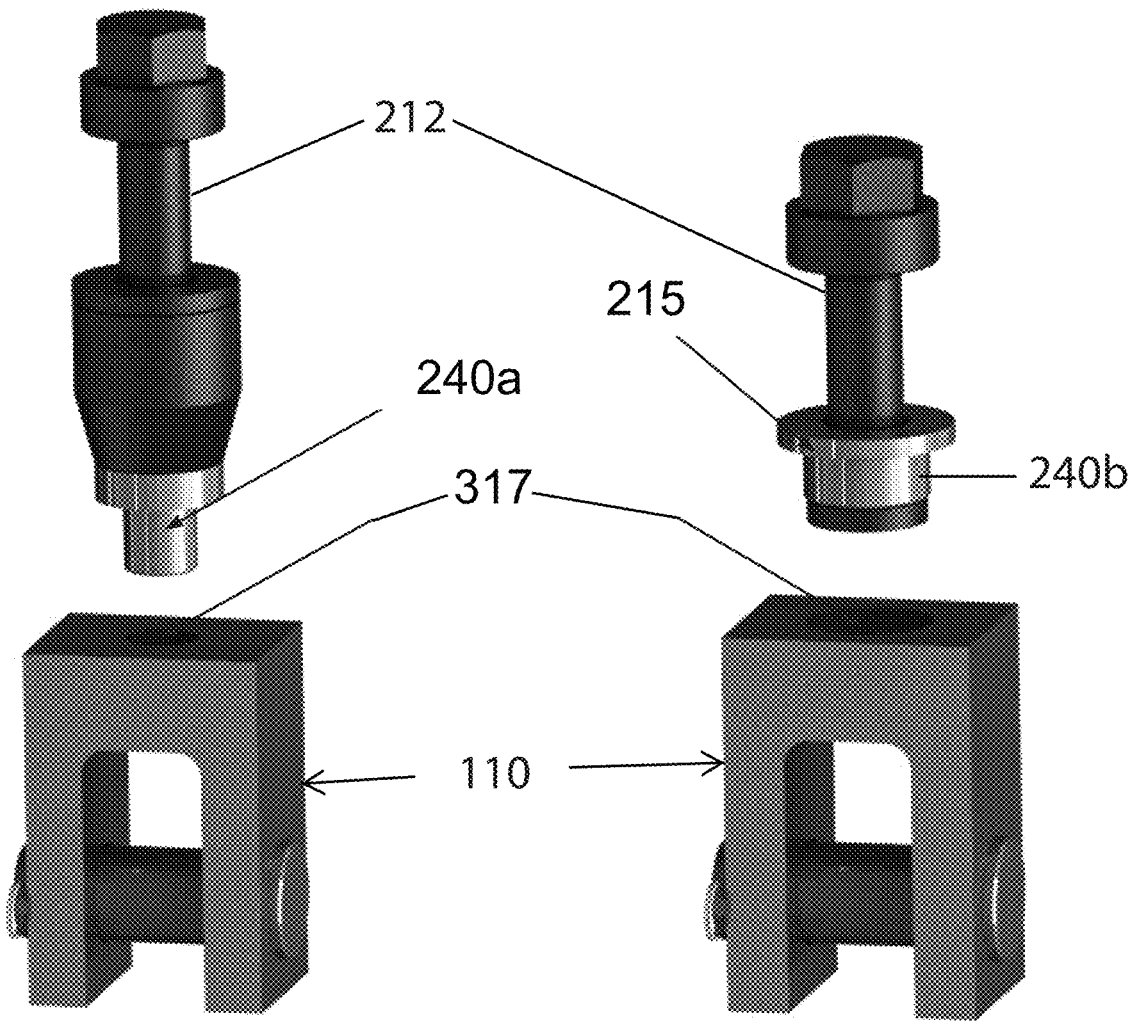

An adaptable clevis 110 can be attached to a tension member 212, 222 in two possible ways based on the thread size on the devises' mounting hole 317:

1) Using an intermediate threaded adapter 240 to attach the clevis 110 to the coupling nut 213 as shown in FIG. 7a;

2) Attaching the clevis 110 directly to a retaining ring 215 after removing the coupling nut 213 from the tension member 212, 222 as shown in FIG. 7b.

As seen in FIGS. 6a and 6b, the tension member 212 includes a tension rod 211 separating its ends, a spherical alignment bushing 218 that ensures alignment within the machine, and a hex nut head 219 that allows for gripping and engagement when tightening the coupling nut 213.

FIGS. 7a and 7b illustrate the two methods of attaching a 110 to a calibrating machine through quick-change threaded tension adapter 240a and retaining ring 240b of the tension member 212. As can be seen in this figure, the tension members 212, 222 can be used with multiple devises 110 and other adapters. Thus, adaptable devises 110 do not need to be made with a dedicated tension rod individually (as currently done by most calibration labs) and this lowers the long-term cost of acquiring devises for a calibration laboratory. Furthermore, the clevis assembly benefits from the self-alignment features built into the quick-change tension adapters system, and the swiveling freedom of the tension members helps with easier and faster setup.

As seen in FIG. 7b, the thread on the mounting hole 317 of a clevis 110 may be made to the size that fits the retaining ring of the quick-change tension member for the same capacity range. This is due to the fact that for larger instruments, the length of the tension area in a calibrating machine becomes critical and removing the coupling nuts from two tension members 212, 222 helps provide more space for mounting the unit under test.

For instance, if a clevis is made for 30 klbf quick-change tension members, it may be attached to the tension member through the retaining ring 240b configuration of FIG. 7b. But attaching the same clevis to a 120 klbf tension member may be done through the coupling nut and using a threaded adapter 240a as shown in FIG. 7a.

Figure 8:
FIG. 8 shows an alternate pin configuration.

FIG. 8 shows a different shoulder pin 820 with a step down from its shoulder 821a to its center diameter portion 823 to an end engagement section 825. In such cases, the internal diameter of the bushing 822 does not match the diameter of the middle section of the shoulder pin 820. The bushing 822 is made to fit the end engagement section 825 of the shoulder pin 820 with smaller diameter than the center diameter portion 822 where it is used to calibrate force instruments. This pin design provides more thickness for the bushing to be able to bear the applied calibration forces.

Clevis Calibration Assembly

Calibration of some force measurement instruments, such as dynamometers and crane scales, require using clevis adapters in a calibrating machine. Clevis assemblies for calibrating various standard instruments may include, as shown in FIGS. 3-5, a clevis 310, a loading pin 320, and a detent pin 326 for increased safety of the calibration.

For most instruments, the diameter of the clevis pin 320 can impact the calibration results. Therefore, manufacturers often specify the pin diameter that must be used with the instrument for both calibration and field use. A calibration lab, during the calibration process, needs to follow this direction and obtain a pin with the right diameter which satisfies safety precautions of the calibration as well. Calibration testing designers evaluate the calibration conditions to ensure that the system can stand the applied forces with proper safety factor. In addition, in some cases, a pin with smaller diameter can be used with a clevis using clevis bushings 325 (see FIG. 2a). The bushings 325 are placed between the pin 320 and the pin receiving holes 315 to center the pin 320 and transfer the load properly.

Clevis rollers 323 and additional clevis pins 320 may be added to an adaptable clevis assembly 300 to increase the number of instruments 330 that can be calibrated by a set of adaptable clevises. As can be seen, the pin receiving holes 315 and clevis rollers 323 may have the same internal diameter, and the shoulder and rollers 323 may have the same outer diameter. Clevises are normally provided in pairs to mount an instrument 330 into a calibrating machine 200. Nonetheless, in some cases a tensile force measurement setup might have two different types of mounting systems at its ends. For instance, a clevis might be combined with a rod end or a threaded adapter to mount the instrument into a calibrating machine.

FIGS. 3-5 show an adaptable clevis kit 300 that may include adaptable devises 310, straight pins 320, or shoulder pins 320a based on calibration laboratory requirements and lists of instruments to calibrate. The adaptable devises 310 may be marked with their loading capacity and typically designed with a 2:1 safety factor and include parallel legs 311 separated by and attached to a top portion 313. Based on market research and categorizing the instruments on the market, the adaptable clevis kits 300 may have capacities of 12000, 30000, 60000, and 120,000 lbf. However, the kits 300 can be designed for any other capacity range considering the variety of instruments that it can calibrate, dimension, capacities of typical calibrating machines, and cost optimization. The straight pins 320 may be designed to fit into the clevis holes 315 closely to minimize stress concentration and the risk of deformation around clevis holes 315 resulting from bearing pressure. The straight pins' 320 diameter may be larger than the working diameter of all shoulder pins 320a and is also designed to calibrate one of the larger instruments in the clevis's capacity range.

Shoulder pins 320a adapt the clevis set for calibrating instruments that need pin diameters smaller than the straight pin 320 of the clevis. Shoulder pins 320a have a smaller diameter at the center which matches the instrument's pin size, however, they have a larger dimeter on the head side (closer to head 321) at the shoulder 321a that fits the clevis holes 315 closely. On their end side, the fit into the clevis hole 315 may be made using a bushing 322. After installation, the bushing 322 and shoulder clevis pin 320a are held together using a detent pin 326 that is supplied with each pin set (the detent pin 326 extends through aligned holes 326a, 326b in the shoulder pin 230a and bushing 322, and the detent pin 326 may include a spring loaded locking ball 326c that prevents removal of the pin 326 accidentally and only releases upon a firm force applied on the ring 326d). This prevents slippage during loading and ensures correct alignment of the shoulder pin 320a with the clevis 320. The bushings 322 are designed in such a way that the shoulder pin assembly can stay horizontal after installation, that is, not at angle, given the tolerances and gaps between assembly parts.

Tension links may be sent to the calibration laboratory with their shackles 370 attached. In such a case, best calibration results can be achieved by calibrating the system altogether with its mating shackles 370. However, the shape and configuration of the shackles 370 generates a small contact area 373 with high stress concentration that often results in indentation of the clevis pins 320. To address this issue, a pin roller 323 can be used for calibrating instruments with shackles 373. During the calibration setup, the roller 323 is slid on the clevis pin 320 that is designed appropriately for the capacity of the instrument and the size of shackles 370. After applying calibration forces, the shackles 370 make contact only with the roller 323, which serve as the sacrificial parts for the clevis pins 320, preventing pin damage. This way the clevis pins are protected from indentation and can be reused for a long period of time (see FIGS. 4 and 5).

While the invention has been described with reference to the embodiments above, a person of ordinary skill in the art would understand that various changes or modifications may be made thereto without departing from the scope of the claims.

The invention claimed is:

1. An adaptable clevis kit for tension force calibration comprising:
   a clevis including parallel legs separated by a top portion, wherein each of the parallel legs includes a pin receiving hole and the top portion includes a mounting hole;
   a straight pin that extends through the pin receiving holes and is sized to fit within an inner diameter of the pin receiving holes; and
   a shoulder pin having a minimum tension rod diameter of less than a diameter of the pin receiving holes and a shoulder having an outer diameter larger than the minimum tension rod diameter and less than the diameter of the pin receiving holes, such that the shoulder extends through the pin receiving holes, wherein the shoulder pin engages a bushing having an outer diameter equal to the shoulder diameter, wherein the bushing extends through the pin receiving hole on a leg opposite from a pin receiving hole engaged with the shoulder.

2. The adaptable clevis kit of claim 1, further comprising a roller with an internal diameter sized to receive the straight or shoulder pin, and with a width that extends between facing sides of the parallel legs.

3. The adaptable clevis kit of claim 2, wherein the roller has an outer diameter larger than the diameter of the pin receiving holes.

4. The adaptable clevis kit of claim 1, wherein the bushing and the shoulder pin engage one another through a detent pin that extends through a detent hole in each of the shoulder pin and bushing.

5. The adaptable clevis kit of claim 1, wherein the shoulder pin comprises a shoulder portion and a center portion, wherein a diameter of the center portion is less than the shoulder portion.

6. The adaptable clevis kit of claim 1, wherein the shoulder portion and center portion have the same diameter.

7. The adaptable clevis kit of claim 6, wherein the shoulder in further includes a head and an end engagement section at opposite ends of the shoulder pin, wherein the end engagement section has a diameter less than the center portion diameter.

\* \* \* \* \*